(12) United States Patent
Koo et al.

(10) Patent No.: US 6,687,435 B2
(45) Date of Patent: Feb. 3, 2004

(54) OPTICAL FIBER GRATING CODER FOR USE IN OPTICAL CODE DIVISION MULTIPLE ACCESS, FABRICATING METHOD AND APPARATUS THEREFOR

(75) Inventors: Hyun Deok Koo, Seoul (KR); Sang Bae Lee, Seoul (KR); Sang Sam Choi, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/986,593

(22) Filed: Nov. 9, 2001

(65) Prior Publication Data

US 2002/0186927 A1 Dec. 12, 2002

(30) Foreign Application Priority Data

May 10, 2001 (KR) ............................ 2001-25402

(51) Int. Cl.[7] ................................................. G02B 6/34
(52) U.S. Cl. ............................. 385/37; 385/33; 385/124
(58) Field of Search ............................ 385/33, 37, 124, 385/127

(56) References Cited

U.S. PATENT DOCUMENTS

| 5,367,588 A | 11/1994 | Hill et al. | |
| 5,604,829 A | * | 2/1997 | Bruesselbach ............... 385/37 |
| 5,881,186 A | * | 3/1999 | Starodubov .................. 385/37 |
| 6,240,224 B1 | * | 5/2001 | Reekie et al. ................. 385/37 |
| 6,314,221 B1 | * | 11/2001 | Riant et al. .................... 385/37 |

* cited by examiner

Primary Examiner—Akm Enayet Ullah
Assistant Examiner—Jennifer Doan
(74) Attorney, Agent, or Firm—Oblon, Spivak, McClelland, Maier & Neustadt, P.C.

(57) ABSTRACT

An optical fiber grating coder includes predetermined codewords imprinted into an optical fiber in the form of a plurality of striations through an apparatus including a light source, an amplitude mask, and a phase mask. A fabrication method of the optical fiber grating coder includes providing a light source, an amplitude mask designed for predetermined codewords, a phase mask, and an optical fiber; exposing the optical fiber; and forming an optical fiber grating coder into the optical fiber. A fabrication apparatus of the optical fiber grating coder includes a light source; an amplitude mask designed for predetermined codewords; a phase mask; and an optical fiber where the optical fiber grating coder is to be formed.

19 Claims, 8 Drawing Sheets

US 6,687,435 B2

OPTICAL FIBER GRATING CODER FOR USE IN OPTICAL CODE DIVISION MULTIPLE ACCESS, FABRICATING METHOD AND APPARATUS THEREFOR

BACKGROUND OF THE INVENTION

1. Field of the Invention

The present invention relates to an optical grating coder; and, more particularly, to a chirped optical fiber grating coder implementing predetermined codewords for use in an OCDMA (Optical Code Division Multiple Access) system, a fabricating method and an apparatus therefor.

2. Description of the Related Art

An optical fiber grating is generally fabricated by using the refractive index variation of a core of an optical fiber when a core doped with Germanium (Ge) is exposed to an ultraviolet light. A short-period optical fiber grating is typically referred to an optical fiber grating. The short-period optical fiber grating has a grating period of 0.5 $\mu$m, approximately, and a length less than 10 mm. The short-period optical fiber grating may be used as a reflection filter for filtering light wavelengths, external reflection mirrors of an optical fiber laser and a semiconductor laser, an optical fiber grating Fabry-Perot etalon, and the like.

A fabricating method of an optical fiber grating is generally classified into two: one is to form an interference fringe induced by the interference of ultraviolet lights and to imprint the interference fringe into a core of an optical fiber; and the other, which is gaining popularity, is to utilize a phase mask creating an interference pattern of the ultraviolet lights in the fabrication process of the optical fiber grating.

FIG. 1 shows an apparatus for fabricating a short-period optical fiber grating by utilizing a phase mask according to the prior art. The apparatus 100 of FIG. 1 comprises a light source 101, a convex lens 102, a phase mask 104, and a single-mode optical fiber 106 that is typically used in a telecommunication system. In FIG. 1, in order to measure the transmission characteristics of a short-period fiber grating 112 imprinted into the fiber 106, an optical spectrum analyzer 106 and an optical amplifier 110 are also provided in the apparatus 100.

The light source 101 may be one of a KrF excimer laser (248 nm), a second harmonic laser (244 nm) of an Ar laser, and a fourth harmonic laser (265 nm) of an Nd:YAG laser. The light source 101 irradiates a coherent ultraviolet light beam to the fiber 106. The ultraviolet light beam reaches on the fiber 106 through the convex lens 102 and the phase mask 104. In practice, after the diffraction by the phase mask 104, a zero-order beam has been suppressed to less than 5% of incident light beams. Light beams exiting the phase mask 104 are the diverging plus-one and minus-one orders, each of which contained typically more than 30% of the incident light beams. The diffracted light of the plus-one and minus-one orders form interference fringes prior to reaching on the fiber 106. The interference fringes are imprinted into the fiber 106 to produce the short-period fiber grating 112.

A Ge-doped or a Ge- and B(boron)-doped optical fiber is commonly used in the fabrication of the short-period fiber grating 112. The fiber 106 may be the Ge-doped or the Ge- and B-doped optical fiber. As is well known in the art, it is required to perform a hydrogen ($H_2$) treatment on the fiber 106 in order to form the short-period fiber grating 112 thereon.

FIG. 2 presents an apparatus for fabricating a chirped fiber grating according to the prior art. The apparatus 200 of FIG. 2 comprises a light source 201, a concave lens 202, a convex lens 204, a phase mask 206, a single-mode optical fiber 208 for use in the telecommunication system. Similar to the optical amplifier 110 and the optical spectrum analyzer 108 of FIG. 1, an optical amplifier 210 and an optical spectrum analyzer 212 are also provided for measuring the transmission characteristics of a chirped fiber grating 214.

As seen from FIG. 2, a grating period of the chirped fiber grating 214 is gradually changed along the axis of the fiber 208 different to that of the short-period fiber grating 112 shown in FIG. 1. The chirped fiber grating 214 induces a time difference to light beams irradiated from the optical amplifier 210 to the fiber 208 depending on the wavelengths of the light beams. Using the time difference induced by the chirped fiber grating 214, it is possible to compensate the dispersion of the light beams from the optical amplifier 210 propagating the fiber 208 depending on the dispersion characteristics thereof, so that the chirped fiber grating 214 may be suitable for an ultrahigh-speed optical communication system.

In order to use the chirped fiber grating 214 as an optical grating coder in an OCDMA (Optical Code Division Multiple Access) system, it is required to connect to each other short-period fiber gratings (or chirped fiber gratings), each of which has a different grating period, or to fabricate a super-structural fiber grating having a length enough for implementing desired codewords.

Specifically, after forming one short-period fiber grating on an optical fiber, by moving the optical fiber to a predetermined direction in order to prevent from overlapping the short-period fiber grating formed on the optical fiber with another short-period fiber grating to be formed thereon, a chirped optical fiber grating coder consist of a plurality of the short-period gratings having different grating periods is fabricated enough for implementing desired codewords. To use the process described above, however, would call for an additional procedure of alternating a plurality of phase masks during the fabrication of the chirped optical fiber grating coder. Further, the length of the chirped optical fiber grating coder fabricated would be elongated as a number of the short-period fiber gratings for implementing the desired codewords are increased.

Consequently, there are some drawbacks that the conventional fabrication process of the chirped optical fiber grating coder takes much time and a plurality of phase masks is necessary.

SUMMARY OF THE INVENTION

It is, therefore, an objective of the present invention to provide a chirped optical fiber grating coder implementing predetermined codewords for use in an OCDMA system, a fabricating method and an apparatus therefor.

In accordance with one aspect of the present invention, there is provided an optical fiber grating coder comprising predetermined codewords imprinted into an optical fiber in the form of a plurality of striations through an apparatus including a light source, an amplitude mask, and a phase mask.

In accordance with another aspect of the present invention, there is provided a method for fabricating an optical fiber grating coder, comprising the steps of: a) providing a light source; b) providing an amplitude mask designed for predetermined codewords; c) providing a phase mask; d) providing an optical fiber; e) exposing the optical fiber to a light beam irradiated from the light source passing sequentially through the amplitude and phase masks; and f)

forming an optical fiber grating coder on the optical fiber, including the predetermined codewords in the form of a plurality of stripes.

In accordance with still another aspect of the present invention, there is provided an apparatus for fabricating an optical fiber grating coder, comprising: a light source; an amplitude mask designed for predetermined codewords; a phase mask; and an optical fiber.

BRIEF DESCRIPTIONS OF THE DRAWINGS

The above and other objects and features of the present invention will become apparent from the following description of a preferred embodiment given in conjunction with the accompanying drawings, in which:

FIG. 1 shows an apparatus for fabricating a short-period optical fiber grating according to the prior art;

FIG. 2 presents an apparatus for fabricating a chirped optical fiber grating according to the prior art;

Figure 6:
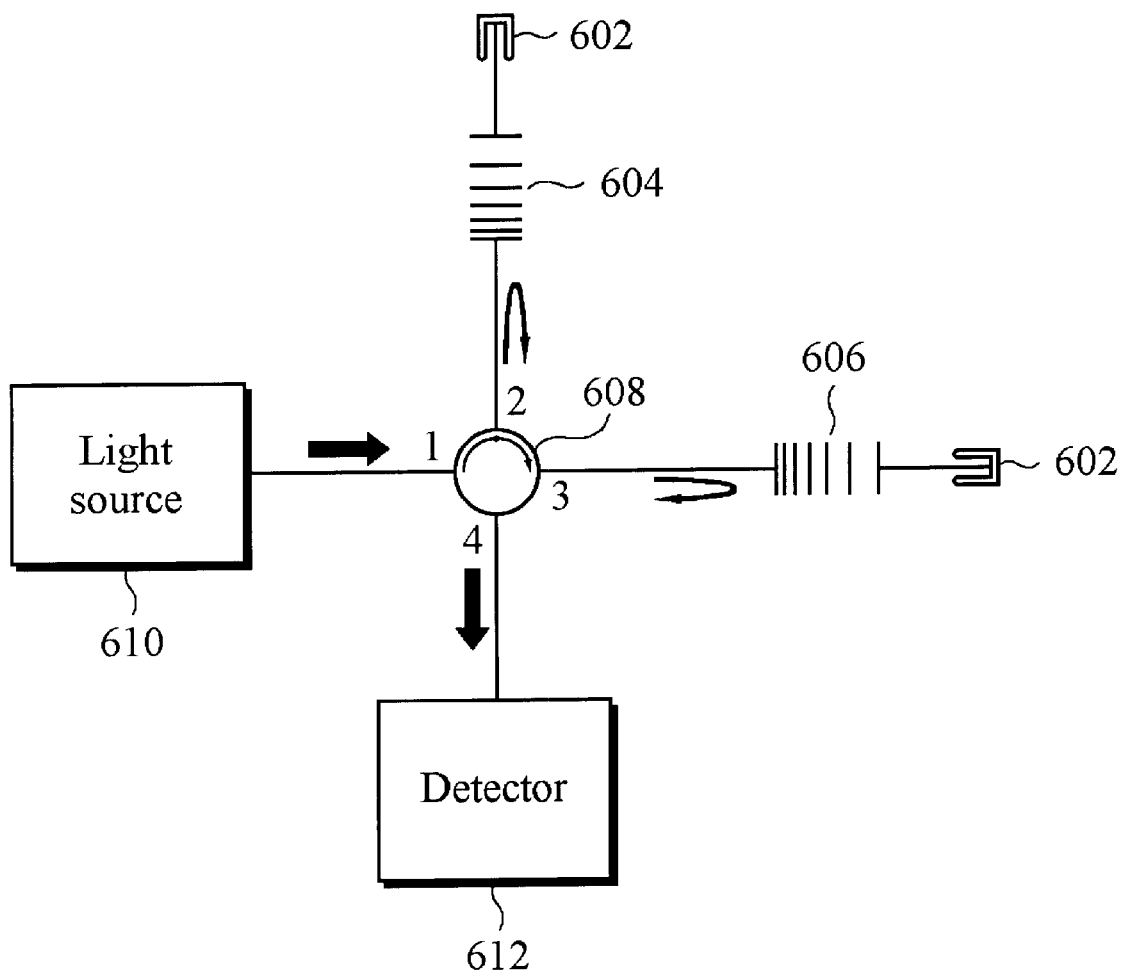
Figure 7:
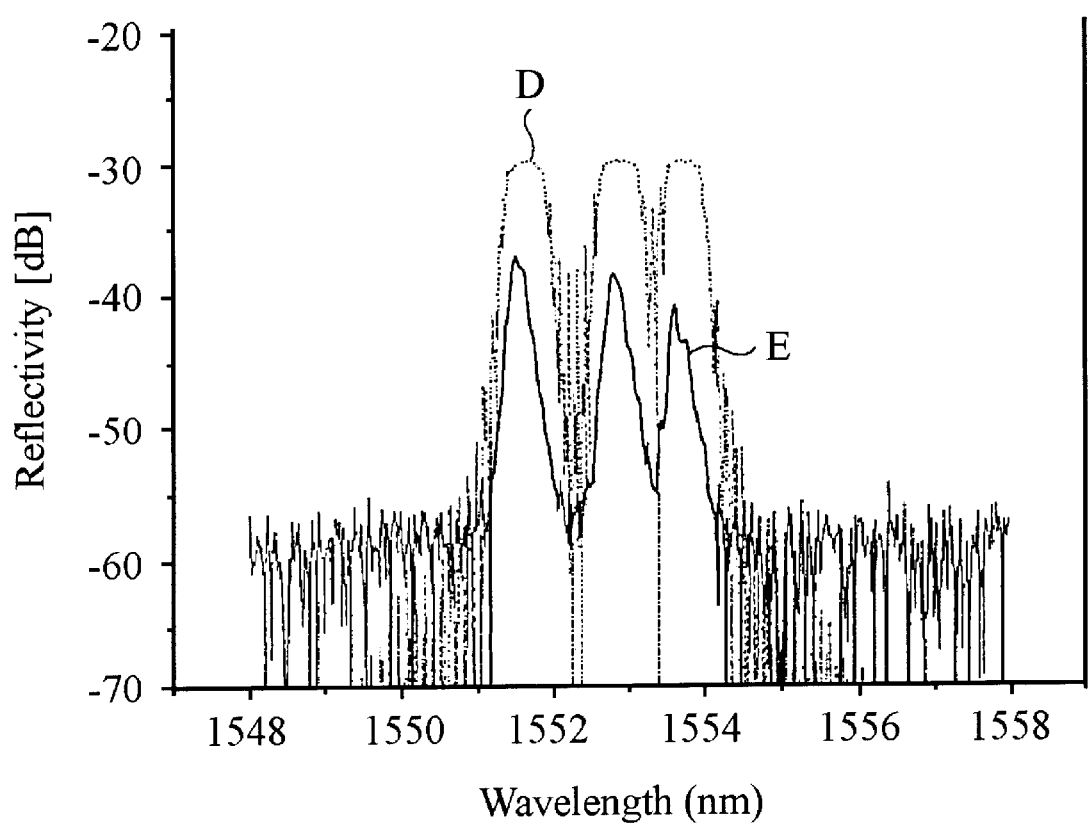
Figure 8:
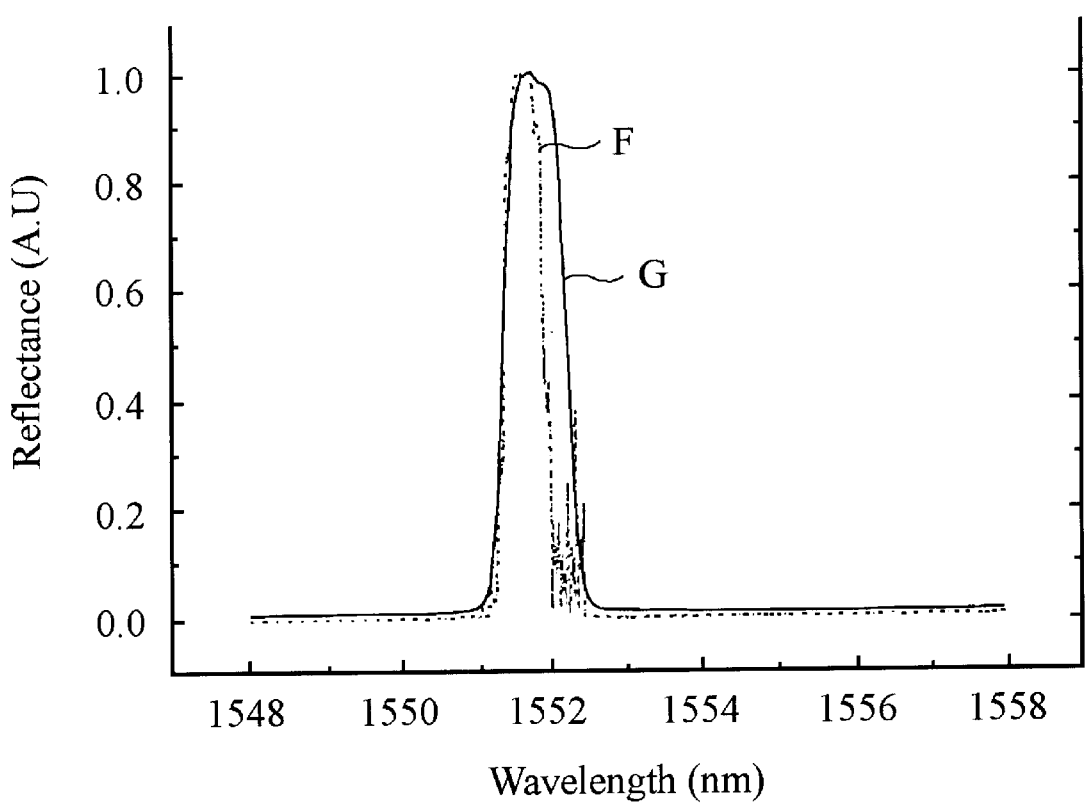

FIG. 6 exemplifies a schematic diagram of an OCDMA (Optical Code Division Multiple Access) system employing the chirped optical fiber grating coder fabricated in accordance with the present invention;

FIG. 7 gives a graph showing measured and simulated auto-correlation values of the chirped optical fiber grating coder fabricated in accordance with the present invention; and FIG. 8 is a graph showing measured and simulated cross-correlation values of the chirped optical fiber grating coder fabricated in accordance with the present invention.

DETAILED DESCRIPTION OF THE PRESENT INVENTION

Figure 3:
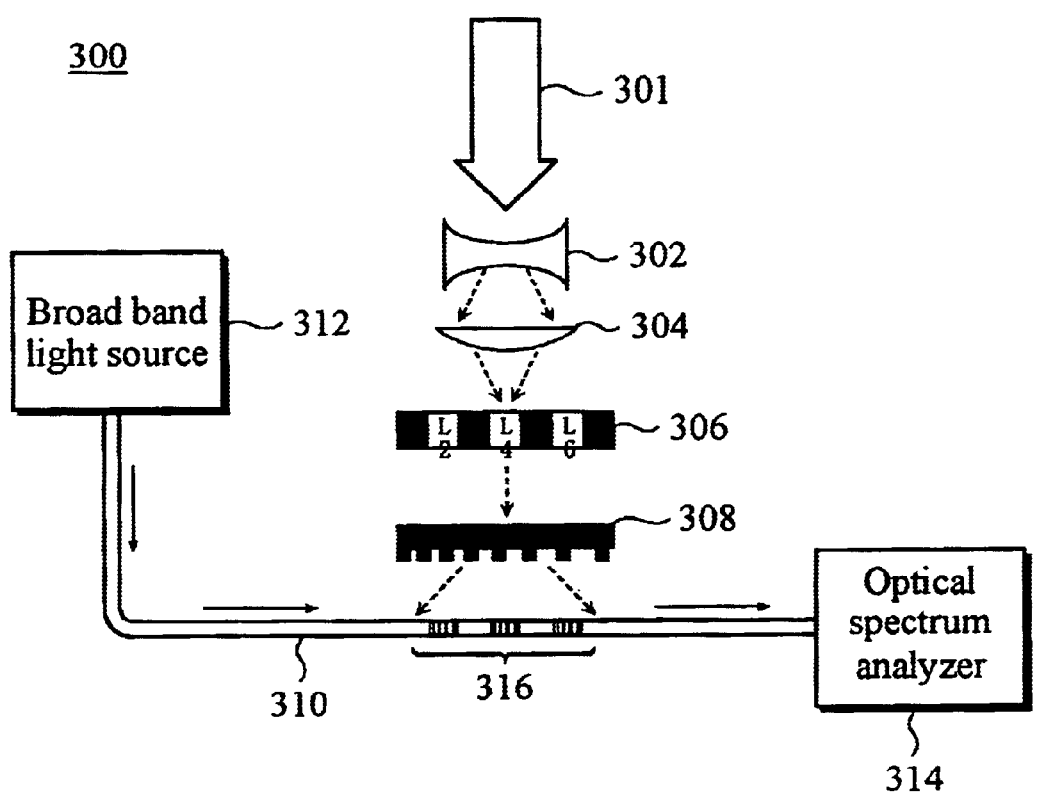
FIG. 3 illustrates an apparatus for fabricating a chirped optical fiber grating coder in accordance with the present invention.

FIG. 3 illustrates an apparatus for fabricating a chirped optical fiber grating coder in accordance with the present invention. The apparatus 300 of FIG. 3 comprises a light source 301 emitting an ultraviolet light beam, a concave lens 302, a convex lens 304, an amplitude mask 306, a chirped phase mask 308, and a single-mode optical fiber 310 for use in the telecommunication system.

Similar to the prior art described above, a broadband light source (BBS) 312 and an optical spectrum analyzer 314 are provided for measuring the transmission characteristics of a chirped optical fiber grating coder 316 formed in a core of the fiber 310. Specifically, an Erbium-doped optical amplifier may be used as the BBS 312. The optical spectrum analyzer 314 is commercially available.

The chirped phase mask 308 of FIG. 3 is defined by three characteristics that are the length, range, chirping rate of it. According to predetermined codewords, the chirped phase mask 308 is used as wavelength ranges can be totally covered with one in predetermined ranges. The amplitude mask 306 should be designed not only for the phase mask 308 but also the predetermined codewords. Such designed amplitude mask 306 has the same length of the chirped phase mask 308. In general, codewords are generated by various methods. The amplitude mask 306 is divided into seven sections and the codewords are selected based on the prime sequence that the numbers 1 overlap with each other and the others does not overlap, as a combination which three sections among the seven sections have 1 and four sections are 0. For example, the chirped phase mask 308 is, e.g., 5 cm long and has a center wavelength of, e.g., 1553 nm (nanometer) and a chirping rate of 0.4 cm/nm. The amplitude mask 306 has predetermined codewords, e.g., {0, 1, 0, 1, 0, 1, 0}. Hereinafter, the predetermined codewords will be referred as codewords 4.

It is possible to form the chirped optical fiber grating coder 316 by using the chirped phase mask 308 and the amplitude mask 306 designed for the codeword 4. The amplitude mask 306 selectively transmits the ultraviolet light beam depending on wavelengths, thereby forming chirped gratings constructing the chirped optical fiber grating coder 316. The chirped gratings implement the codeword 4 by the BBS 312 at a desired wavelength. The principle for fabricating the chirped optical fiber grating coder 316 may be understood in terms of a transfer matrix. The total length of chirped gratings is divided into N sections. A reflection peak at a desired wavelength is selected in consideration of the transfer matrix based on a chirping rate in each section and the length of the fiber 310 to be exposed to the ultraviolet light beam. The width of reflection peak of the chirped optical fiber grating coder 316 is also adjusted.

Figure 4A:
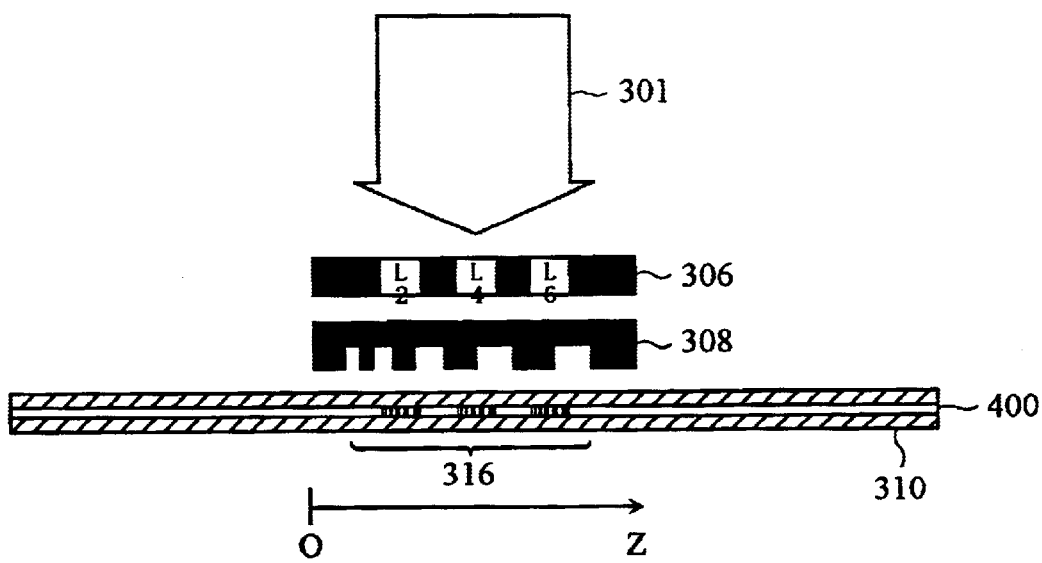
FIG. 4A represents an enlarged view of the chirped optical fiber grating coder shown in FIG. 3.

FIG. 4A represents an enlarged view of the chirped optical fiber grating coder 316 fabricated in accordance with the present invention. As represented in FIG. 4A, the chirped optical fiber grating coder 316 is formed on a core 400 of the fiber 310 by radiating an ultraviolet light beam through the amplitude mask 306 and the chirped phase mask 308. The chirped optical fiber grating coder 316 consists of a plurality of chirped gratings in the form of striations, which implement the codewords 4.

Figure 4B:
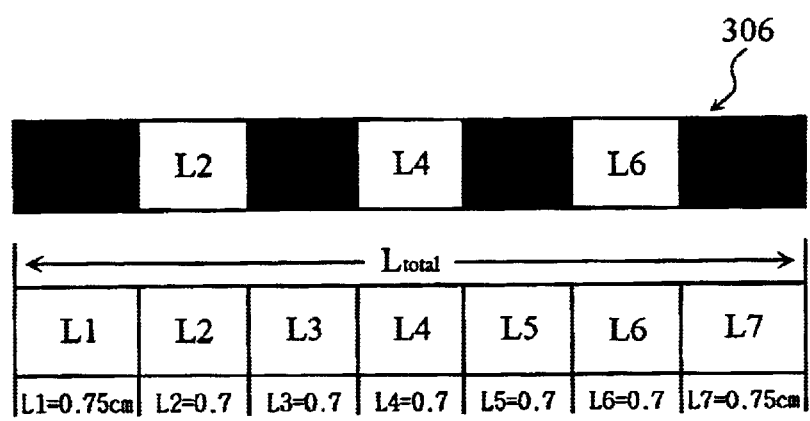
FIG. 4B is an enlarged view of an amplitude mask used in the fabrication of the chirped optical fiber grating coder shown in FIG. 4.

FIG. 4B is an enlarged view of the amplitude mask 306 designed for the codewords 4 employed in the present invention. As described above, the amplitude mask 306 is designed for the codewords 4. The total length $L_{total}$ of the amplitude mask 306 is about 5 cm and is divided into seven sections ranging from L1 to L7. Each section represents an individual value of the codewords 4. The respective length of L1 and L7 is about 0.75 cm and that of the remaining sections L2 to L6 is about 0.7 cm.

The codewords 4 are formed such that each section shares one wavelength of the BBS 312 among available wavelengths thereof to make a correlation between the remaining wavelengths which is not shared to zero based on the prime sequence of a wavelength number ω forming the codewords 4. Thus, the amplitude mask 306 has been divided into L1 to L7 sections as described above.

Figure 1:
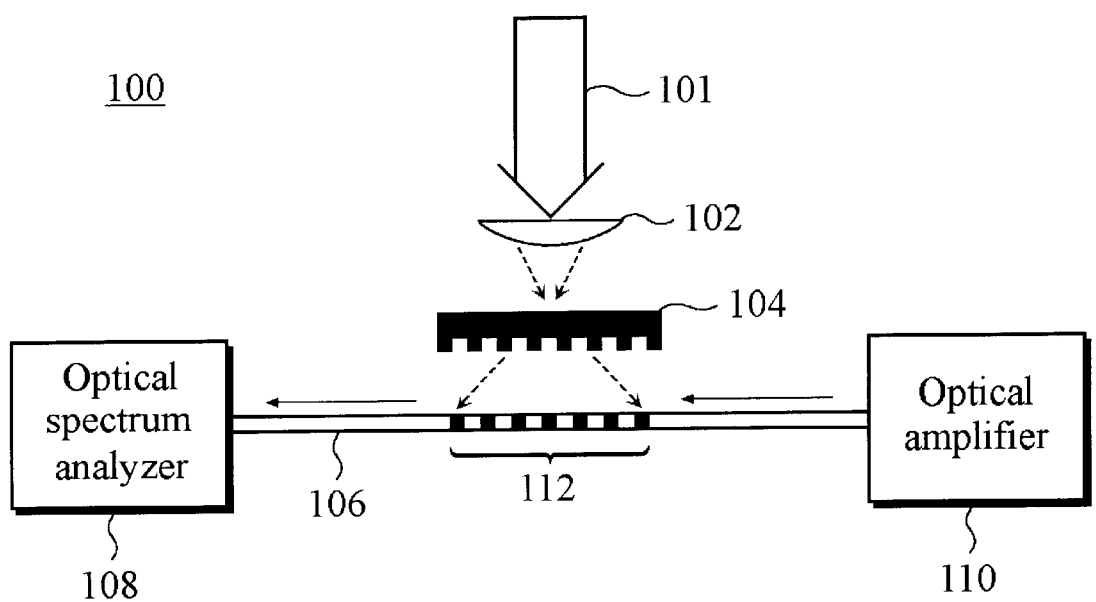
Figure 2:
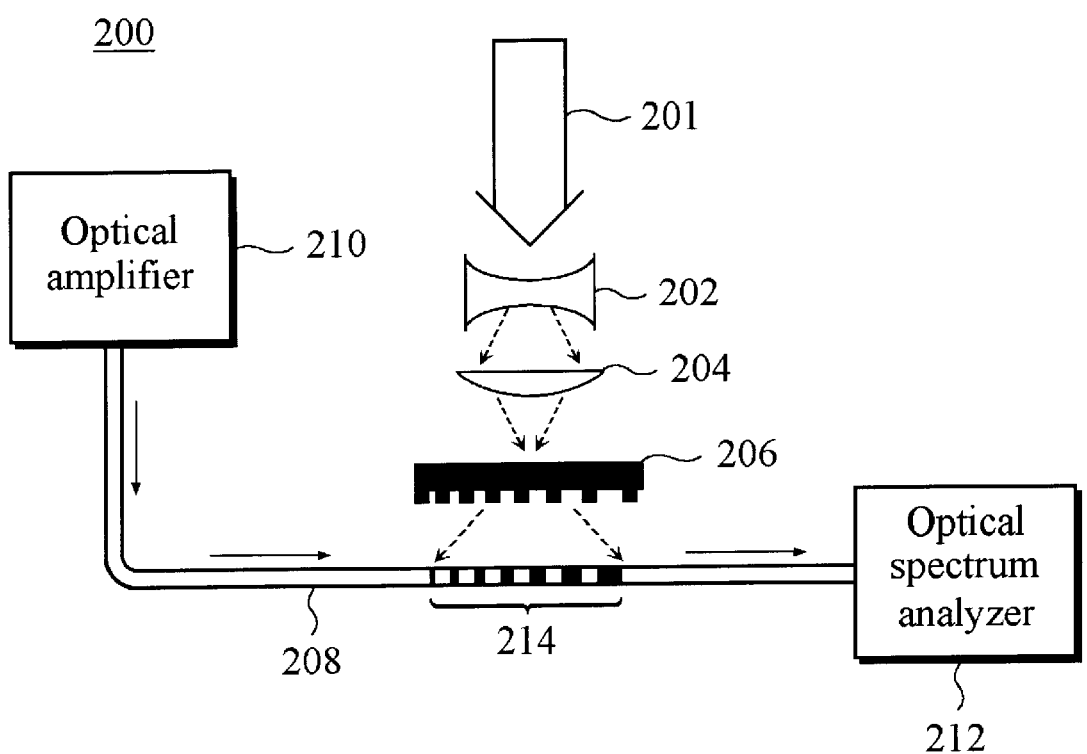
Figure 5:
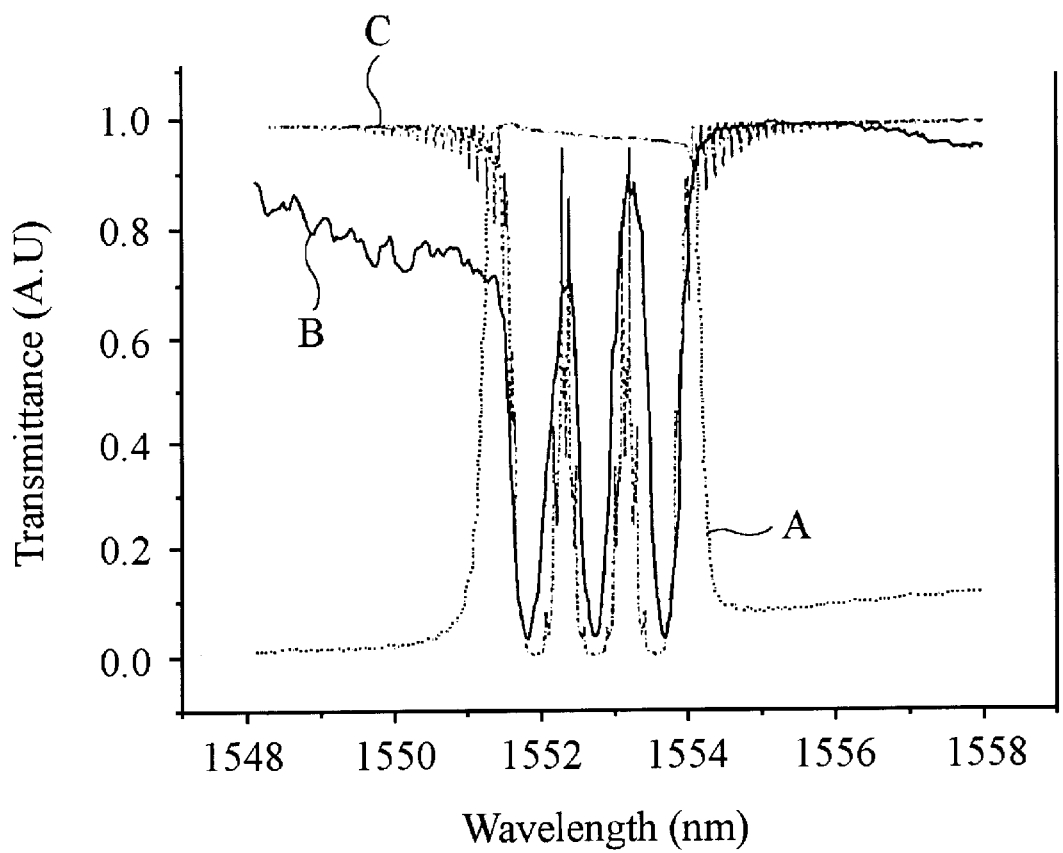
FIG. 5 is a graph showing measured and simulated transmission spectra for the chirped optical fiber grating coders fabricated according to the prior art and the present invention.

FIG. 5 is a graph showing measured and simulated transmission spectra for the conventional chirped optical fiber grating coder and for the inventive chirped optical fiber grating coder 316 shown in FIG. 3. Specifically, curve "A" of FIG. 5 is a reflection spectrum of the conventional chirped optical fiber grating coder described in reference to FIG. 2; curve "B" is a simulation result for the codewords 4; and curve "C" is a transmittance spectrum of the inventive chirped optical fiber grating coder 316 implementing the codewords 4 fabricated in accordance with the present invention. As seen from FIG. 5, the transmittance spectrum curve "C" of the chirped optical fiber grating coder 316 is well matched to the simulation result of the codewords 4.

FIG. 6 exemplifies a schematic diagram of an OCDMA system employing a chirped optical fiber grating coder fabricated in accordance with the present invention. As shown in FIG. 6, the OCDMA system 600 comprises two light-absorbing units 602, a chirped optical fiber grating coder 604 implementing the codewords 4, a chirped optical fiber grating coder 606 (for codewords 4 or codewords 5), a 4-port circulator 608, a light source 610, and a detector 612. The light source 610 may be an Erbium-doped optical amplifier and the detector 612 may be an optical spectrum analyzer or a photodiode.

FIG. 7 gives a graph showing measured and simulated auto-correlation values of the chirped optical fiber grating coders 604 and 606 in the OCDMA system 600. Specifically, curve "D" of FIG. 7 is a simulated auto-correlation value and curve "E" is a measured auto-correlation value. As shown in FIG. 7, the measured auto-correlation value represents a correlation reflective peak over 99% at each peak. It is well matched to the simulated auto-correlation value.

FIG. 8 is a graph showing measured and simulated cross-correlation values of the chirped optical fiber grating coders 604 and 606 in the OCDMA system 600. Specifically, curve "F" of FIG. 8 is a simulated cross-correlation value between the codewords 4 and 5; and curve "G" is a measured cross-correlation value between the same codewords. The measured cross-correlation value is well matched to the simulated cross-correlation value, indicating that the inventive chirped optical fiber grating coder is suitable for an OCDMA system.

Table 1 represents the values of the auto-correlation and cross-correlation measured by the detector 612 in the OCDMA system 600 and the ratio of the values.

TABLE 1

| Auto-correlation value | Cross-correlation value | Auto-correlation/ cross-correlation |
|---|---|---|
| 60.5 mV | 21 mV | 2.88/1 |

In the OCDMA system, the values of the auto-correlation and cross-correlation are processed as signal and noise, respectively. Therefore, it is possible to distinguish signal from noise when an inventive chirped optical fiber grating coder implementing predetermined codewords is fabricated based on the values listed on Table 1.

As described above, in the fabrication of the chirped optical fiber grating coder 316 on the core 400 of the single-mode optical fiber 310 by irradiating the ultraviolet light beams from the light source 301, the amplitude mask 306 designed for desired codewords and the chirped phase mask 308 are disposed between the fiber 310 and the light source 301, so that the transmission peak position and width of the chirped optical fiber grating coder 316 can be determined for the desired codewords. Thus, the fabrication method and apparatus in accordance with the present invention are simple and cost-effective than the prior art. Also, it is provided a high reconstruction of the chirped optical fiber grating coder.

While the present invention has been described and illustrated with respect to a preferred embodiment of the invention, it will be apparent to those skilled in the art that variations and modifications are possible without deviating from the broad principles and teachings of the present invention which should be limited solely by the scope of the claims appended hereto.

What is claimed is:

1. An optical fiber grating coder comprising:

a plurality of chirped gratings implementing predetermined codewords imprinted into a core of an optical fiber in the form of striations through an apparatus including:

a light source;

an optical device;

an amplitude mask; and a chirped phase mask, wherein the light source irradiates a coherent light beam and the coherent light beam passes sequentially through the optical device, the amplitude mask, and the phase mask to reach the core of the optical fiber on which the plurality of chirped gratings are to be formed, and wherein the amplitude mask comprises a plurality of sections and selectively transmits the coherent light beam on the basis of a wavelength of the coherent light beam.

2. The optical fiber grating coder of claim 1, wherein the predetermined codewords are defined through the plurality of sections of the amplitude mask, wherein parts of the plurality of sections transmit the coherent light beam, the coherent light beam being incident upon the amplitude mask passing through the optical device.

3. The optical fiber grating coder of claim 1, wherein the plurality of chirped gratings are formed along an axis of the optical fiber perpendicular to the coherent light beam, each chirped grating having a chirping pattern defined by the chirped phase mask.

4. The optical fiber grating coder of claim 1, wherein the optical device comprises a combination of a concave lens and a convex lens.

5. The optical fiber grating coder of claim 1, wherein the coherent light beam comprises an ultraviolet light beam.

6. The optical fiber grating coder of claim 1, wherein the coherent light beam comprises an ultraviolet laser beam.

7. The optical fiber grating coder of claim 1, wherein the optical fiber grating coder is used as one of an encoder and a decoder in an OCDMA (Optical Code Division Multiple Access) system.

8. A method for fabricating an optical fiber grating coder, comprising:

a) providing a light source;

b) providing an amplitude mask designed for predetermined codewords;

c) providing a chirped phase mask;

d) providing an optical fiber;

e) exposing the optical fiber to a coherent light beam irradiated from the light source, which passes sequentially through an optical device, the amplitude mask, and the chirped phase mask to reach a core of the optical fiber; and f) forming a plurality of chirped gratings implementing the predetermined codewords in the core of the optical fiber in the form of striations, wherein the plurality of chirped gratings function as an optical fiber grating coder, and wherein the amplitude mask and the chirped phase mask are provided between the optical device and the optical fiber, and the chirped phase mask is located between the amplitude mask and the optical fiber.

9. The method of claim 8, wherein the plurality of chirped gratings are formed along an axis of the optical fiber perpendicular to the coherent light beam, each chirped grating having a chirping pattern defined by the chirped phase mask.

10. The method of claim 8, wherein the amplitude mask comprises a plurality of sections and selectively transmits the coherent light beam on the basis of a wavelength of the coherent light beam and the predetermined codewords are defined through the plurality of sections of the amplitude mask, and wherein parts of the plurality of sections transmit the coherent light beam to the chirped phase mask and the remainder of the plurality of sections isolate the coherent light beam, the coherent light beam being incident upon the amplitude mask passing through the optical device.

11. The method of claim 8, wherein the optical device comprises a combination of a concave lens and a convex lens.

12. An apparatus for fabricating an optical fiber grating coder, comprising:

a light source;

an optical device;

an amplitude mask designed for predetermined codewords;

a chirped phase mask; and an optical fiber, wherein a coherent light beam irradiated from the light source reaches a core of the optical fiber, which passes sequentially through the optical device, the amplitude mask, and the chirped phase mask to imprint a plurality of chirped gratings implementing the predetermined codewords in the form of striations into the core of the optical fiber, and wherein the amplitude mask comprises a plurality of sections and selectively transmits the coherent light beam on the basis of a wavelength of the coherent light beam.

13. The apparatus of claim 12, wherein the plurality of chirped gratings are formed along an axis of the optical fiber perpendicular to the coherent light beam, each chirped grating having a chirping pattern defined by the chirped phase mask.

14. The apparatus of claim 12, wherein the predetermined codewords are defined through the plurality of sections of the amplitude mask, and wherein parts of the plurality of sections transmit the coherent light beam to the chirped phase mask and the remainder of the plurality of sections isolate the coherent light beam, the coherent light beam being incident upon the amplitude mask passing through the optical device.

15. The apparatus of claim 12, wherein the plurality of chirped gratings function as an optical fiber grating coder.

16. The apparatus of claim 12, wherein the coherent light beam comprises an ultraviolet light beam.

17. The apparatus of claim 12, wherein the coherent light beam comprises an ultraviolet laser beam.

18. The apparatus of claim 12, wherein the optical fiber grating coder is used as one of an encoder and a decoder in an OCDMA system.

19. The apparatus of claim 12, wherein the optical device comprises a combination of a concave lens and a convex lens.

* * * * *